US012485423B2

(12) United States Patent
Apodaca Lujan

(10) Patent No.: US 12,485,423 B2
(45) Date of Patent: Dec. 2, 2025

(54) ENCLOSURE DEVICE FOR A DECAPPER, DECAPPER FOR REMOVING A CAP FROM A LABORATORY SAMPLE CONTAINER AND APPARATUS

(71) Applicant: Roche Diagnostics Operations, Inc., Indianapolis, IN (US)

(72) Inventor: Leon Felipe Apodaca Lujan, Markgroeningen (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 0 days.

(21) Appl. No.: 17/650,021

(22) Filed: Feb. 4, 2022

(65) Prior Publication Data

US 2022/0258169 A1 Aug. 18, 2022

(30) Foreign Application Priority Data

Feb. 15, 2021 (EP) .................................... 21157122

(51) Int. Cl.
*B01L 9/00* (2006.01)

(52) U.S. Cl.
CPC ........... *B01L 9/50* (2013.01); *B01L 2200/025* (2013.01); *B01L 2200/0615* (2013.01);
(Continued)

(58) Field of Classification Search
CPC ................ B01L 9/50; B01L 2200/025; B01L 2200/0615; B01L 2200/082;
(Continued)

(56) References Cited

U.S. PATENT DOCUMENTS

| | | | | |
|---|---|---|---|---|
| 4,030,271 | A | 6/1977 | Kefauver et al. | |
| 5,220,767 | A * | 6/1993 | de Santana | B67B 3/2066 53/353 |

(Continued)

FOREIGN PATENT DOCUMENTS

| | | | |
|---|---|---|---|
| EP | 0930504 | A2 | 7/1999 |
| EP | 2538227 | B1 | 2/2015 |

(Continued)

OTHER PUBLICATIONS

European Search Report issued Aug. 6, 2021, in Application No. EP 21157112.9, 2 pp.

*Primary Examiner* — Elizabeth A Robinson
*Assistant Examiner* — Austin Q Le
(74) *Attorney, Agent, or Firm* — Woodard, Emhardt, Henry, Reeves & Wagner, LLP

(57) ABSTRACT

An enclosure device for a decapper for removing a cap from a laboratory sample container, a decapper and an apparatus comprising a decapper. The decapper comprises a cap gripper comprising at least two gripping jaws. At least one of the at least two gripping jaws is displaceable between a holding position and a release position in a radial direction. The enclosure device comprises an outer enclosure portion and an inner enclosure portion disposed within the outer enclosure portion. The outer enclosure portion comprises a wall portion and a reservoir portion at a bottom of the wall portion. The wall portion is configured to enclose the two gripping jaws. The inner enclosure portion is configured to receive a laboratory sample container and comprises at least two openings configured to allow the two gripping jaws to extend therethrough. The enclosure device is configured to be mounted to the cap gripper.

31 Claims, 1 Drawing Sheet

(52) U.S. Cl.
CPC ... *B01L 2200/082* (2013.01); *B01L 2300/042* (2013.01); *B01L 2300/0609* (2013.01)

(58) Field of Classification Search
CPC ....... B01L 2200/042; B01L 2200/0609; G01N 35/0099; G01N 2035/0405; B67B 7/00
See application file for complete search history.

(56) References Cited

U.S. PATENT DOCUMENTS

| | | | | |
|---|---|---|---|---|
| 6,257,091 | B1 | 7/2001 | Cohen et al. | |
| 6,296,149 | B1 | 10/2001 | Long | |
| 9,199,755 | B1 * | 12/2015 | Cohen | B67B 7/02 |
| 2005/0183388 | A1 * | 8/2005 | Cirio | B67B 3/2066 53/287 |
| 2012/0134769 | A1 * | 5/2012 | Friedman | G01N 35/0099 414/800 |
| 2022/0252629 | A1 * | 8/2022 | Situ | G01N 35/04 |

FOREIGN PATENT DOCUMENTS

| | | | |
|---|---|---|---|
| EP | 3236267 | A1 | 10/2017 |
| GB | 254146 | A | 7/1926 |
| GB | 2559818 | B | 8/2019 |
| JP | 2003-095338 | A | 4/2003 |
| WO | 2019/197337 | A1 | 10/2019 |

* cited by examiner

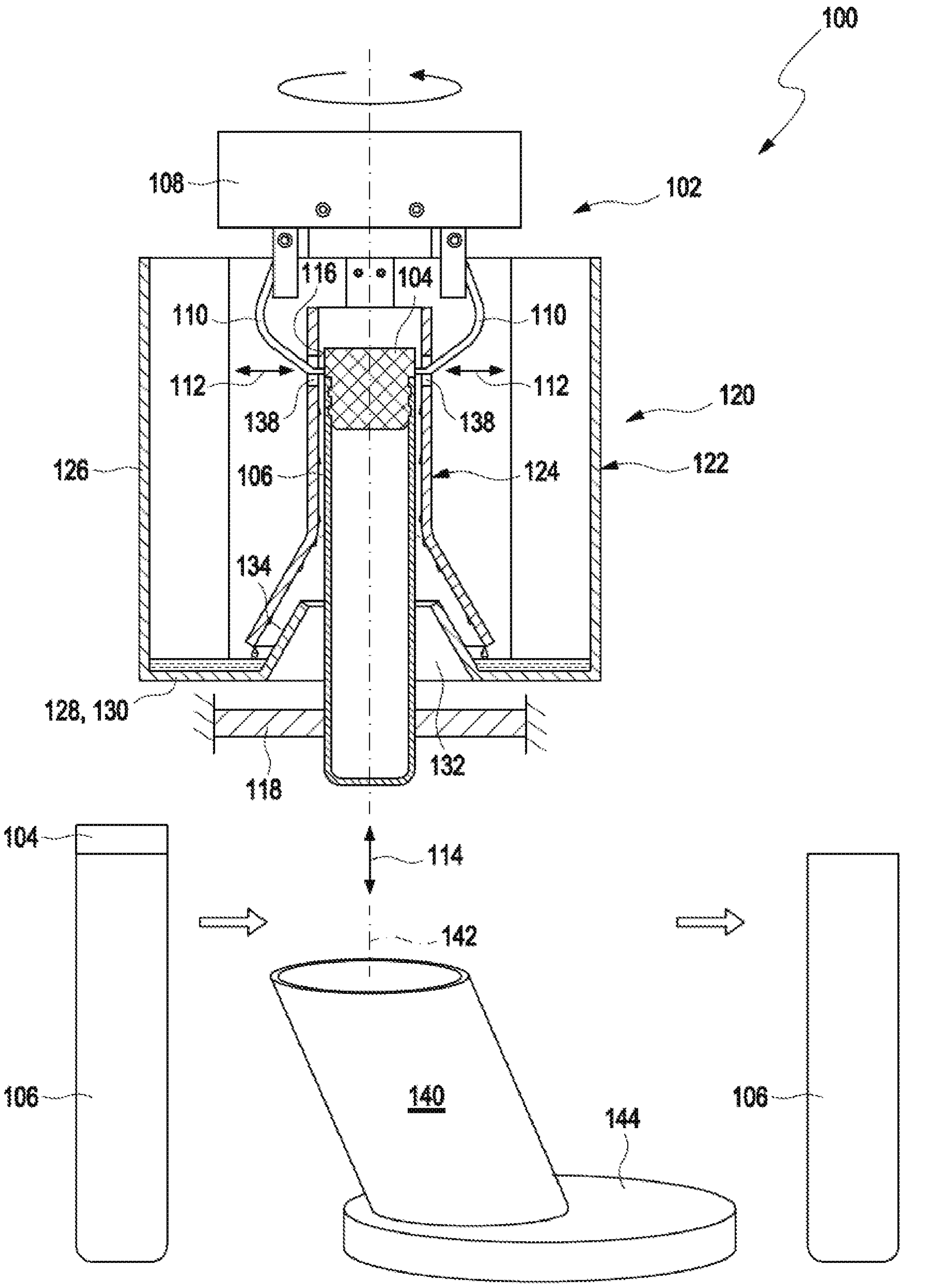
100
108
102
116
104
110
110
112
112
138
138
120
126
106
124
122
134
128, 130
118
132
104
114
142
140
144
106
106

ENCLOSURE DEVICE FOR A DECAPPER, DECAPPER FOR REMOVING A CAP FROM A LABORATORY SAMPLE CONTAINER AND APPARATUS

CROSS-REFERENCE TO RELATED APPLICATIONS

This application claims priority to European Patent Application 21157122.9, filed 15 Feb. 2021, the disclosure of which is hereby incorporated by reference in its entirety.

TECHNICAL FIELD

The present disclosure relates to an enclosure device for a decapper, a decapper for removing a cap from a laboratory sample container, and to an apparatus.

BACKGROUND

In vitro diagnostic testing has a major effect on clinical decisions, providing physicians with pivotal information. Particularly, there is great emphasis on providing quick and accurate test results in critical care settings. In vitro diagnostic testing is usually performed by apparatus such as diagnostic analyzers using instruments operable to execute one or more processing steps or workflow steps on one or more biological samples and/or one or more reagents, such as pre-analytical instruments, post-analytical instruments and also analytical instruments.

Diagnostic instruments or analyzers are configured to obtain a measurement value from a sample. A diagnostic analyzer is operable to determine via various chemical, biological, physical, optical or other technical procedures a parameter value of the sample or a component thereof. A diagnostic analyzer may be operable to measure the parameter of the sample or of at least one analyte and return the obtained measurement value. The list of possible analysis results returned by the analyzer comprises, without limitation, concentrations of the analyte in the sample, a digital (yes or no) result indicating the existence of the analyte in the sample (corresponding to a concentration above the detection level), optical parameters, DNA or RNA sequences, data obtained from mass spectrometry of proteins or metabolites and physical or chemical parameters of various types. A diagnostic analyzer may comprise units assisting with the pipetting, dosing, and mixing of samples and/or reagents.

The diagnostic analyzer may comprise a process and detection system whose workflow is optimized for certain types of analysis. Examples of such analyzers are clinical chemistry analyzers, coagulation chemistry analyzers, immunochemistry analyzers, urine analyzers, nucleic acid analyzers, used to detect the result of chemical or biological reactions or to monitor the progress of chemical or biological reactions.

Such automatic diagnostic analyzers allow to increase the number of analytical processes and obtainable measurements values. For this reason, such automatic diagnostic analyzers use several processing stations for processing several samples provided in reaction vessels at the same time. For example, 2 to 8 or even more different processing stations are present with such a diagnostic analyzer for preparing, processing, analyzing the respective samples.

In laboratories, some types of instruments and/or analysis require closed laboratory sample containers such as sample tubes to be opened before laboratory samples are pretreated and/or analyzed. Therefore, such instruments may have a decapper to remove a cap from the container. A device for decapping and recapping sample tubes is shown in document EP 2 538 227 B1.

Particularly during a decapping process or transporting process of the opened laboratory sample container, spillage of the liquid sample contained in the laboratory sample container may occur. For this reason, in such apparatus or analyzers, several covers are added in the system to protect sensitive areas. Other apparatus or analyzers provide a reservoir but not an enclosure to contain and guide the drops. Despite the advantages provided by these constructions, there are still some drawbacks. The drops are contained far from the originated point. Further, a wider area is affected. Further, these constructions require a big effort to maintain the system clean. Still further, more unnecessary parts added in the system.

SUMMARY

Although the embodiments of the present disclosure are not limited to specific advantages or functionality, it is noted that in accordance with the present disclosure an enclosure device for a decapper, decapper for removing a cap from a laboratory sample container and apparatus with the features of the independent claims are provided that at least minimize or overcome the aforementioned drawbacks. Advantageous embodiments which might be realized in an isolated fashion or in any arbitrary combinations are listed in the dependent claims as well as throughout the specification.

In accordance with one embodiment of the present disclosure, an enclosure device for a decapper for removing a cap from a laboratory sample container is provided, wherein the decapper comprises a cap gripper comprising at least two gripping jaws, wherein at least one of the at least two gripping jaws is displaceable between a holding position and a release position in a radial direction, wherein in the holding position, the at least two gripping jaws are configured to hold the cap and wherein in the release position, the at least two gripping jaws are configured to release the cap; wherein the enclosure device comprises an outer enclosure portion and an inner enclosure portion disposed within the outer enclosure portion, wherein the outer enclosure portion comprises a wall portion and a reservoir portion at a bottom of the wall portion, wherein the wall portion of the outer enclosure portion is configured to enclose the two gripping jaws; and wherein the inner enclosure portion is configured to receive a laboratory sample container and comprises at least two openings configured to allow the two gripping jaws to extend therethrough at least in the holding position, wherein the enclosure device is configured to be mounted to the cap gripper.

In accordance with another embodiment of the present disclosure, a decapper for removing a cap from a laboratory sample container is provided, comprising a cap gripper comprising at least two gripping jaws, wherein at least one of the at least two gripping jaws is displaceable between a holding position and a release position in a radial direction, wherein in the holding position, the at least two gripping jaws are configured to hold the cap and wherein in the release position, the at least two gripping jaws are configured to release the cap, wherein the decapper further comprises an enclosure device according to an embodiment of the present disclosure.

In accordance with yet another embodiment of the present disclosure, an apparatus comprising a decapper according to an embodiment of the present disclosure and a cap receiver is provided, wherein the cap receiver is rotatable between a receiver position and a storage position around a receiver axis, wherein in the receiver position the decapper and the cap receiver are arranged such that the cap receiver is configured to receive the released cap from the decapper and wherein in the storage position the cap receiver is configured to allow removing of the cap from the laboratory sample container.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawing, where like structure is indicated with like numerals and in which:

FIG. 1 shows a schematic illustration of an apparatus.

Skilled artisans appreciate that elements in the FIGURE are illustrated for simplicity and clarity and have not been drawn to scale. For example, dimensions of some of the elements in the FIGURE may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The present disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the present disclosure and without any restriction regarding the possibility of combining the features introduced in such way with other optional or non-optional features of the present disclosure.

According to a first aspect of the present disclosure, an enclosure device for a decapper for removing a cap from a laboratory sample container is disclosed. The decapper comprises a cap gripper comprising at least two gripping jaws. At least one of the at least two gripping jaws is displaceable between a holding position and a release position in a radial direction. In the holding position, the at least two gripping jaws are configured to hold the cap. In the release position, the at least two gripping jaws are configured to release the cap. The enclosure device comprises an outer enclosure portion and an inner enclosure portion disposed within the outer enclosure portion. The outer enclosure portion comprises a wall portion and a reservoir portion at a bottom of the wall portion. The wall portion of the outer enclosure portion is configured to enclose the two gripping jaws. The inner enclosure portion is configured to receive a laboratory sample container and comprises at least two openings configured to allow the two gripping jaws to extend therethrough at least in the holding position. The enclosure device is configured to be mounted to the cap gripper.

Thus, any sample liquid spilled out of the laboratory sample container may be received by the enclosure device and its outer enclosure portion and inner enclosure portion. The spilled liquid can then be reliably guided to the reservoir portion where it is at least temporarily stored.

The enclosure device may be configured to be releasably mounted to the cap gripper. Thus, the enclosure device can be removed from the cap gripper, for example for cleaning or maintenance purposes.

The enclosure device may be configured to be mounted to the cap gripper at a top of the wall portion. Thus, the gripping jaws are laterally or radially surrounded by the wall portion.

The reservoir portion may be configured to surround the laboratory sample container. Thus, any spillage from the laboratory sample container may be reliably captured by the reservoir portion.

The wall portion of the outer enclosure portion may be a continuous wall portion. Thus, the wall portion does not comprise any openings or interruptions but forms a closed surface facing the laboratory sample container and the gripping jaws.

The wall portion of the outer enclosure portion may be configured to completely enclose the two gripping jaws in a circumferential direction. Thus, the wall portion forms a kind of closed casing such that any liquid may not escape to an outside of the enclosure device.

The reservoir portion may comprise a reception opening configured to allow the laboratory sample container to extend therethrough. Thus, laboratory sample container may be inserted through the reception opening so as to be surrounded by the reservoir portion preventing any leakage of spilled liquid.

The reservoir portion may comprise a rim defining the reception opening. Thus, any spilled liquid may be kept in the reservoir portion.

The rim may protrude towards a top of the wall portion. Thus, a kind of dam is formed and any spilled liquid may be reliably stored in the reservoir portion.

The rim may be cylindrically shaped. Alternatively, the rim may be conically shaped. Thus, the rim may be adapted to the respective application and to the sizes of the laboratory sample container.

The reservoir portion may be permanently connected to the wall portion. Thus, a liquid tight construction is provided. Alternatively, the reservoir portion may be releasably connected to the wall portion. Thus, the reservoir portion may be removed for cleaning purposes without the need to remove the complete enclosure device from the cap gripper.

The wall portion may be substantially cylindrically shaped. Thus, a symmetrically shape is give preventing any imbalances when rotating the cap gripper together with the enclosure device.

The reservoir portion and the inner enclosure portion may be connected to one another. Alternatively, the reservoir portion and the inner enclosure portion may be integrally formed. Thus, a liquid tight construction is given.

The inner enclosure portion may be at least partially cylindrically shaped. Thus, a symmetrically shape is give preventing any imbalances when rotating the cap gripper together with the enclosure device.

The inner enclosure portion may be configured to limit a movement of the cap in the radial direction. Thus, the cap may be tightly engaged by the gripping jaws.

According to a second aspect of the present disclosure, a decapper for removing a cap from a laboratory sample container is disclosed. The decapper comprises a cap gripper comprising at least two gripping jaws. At least one of the at least two gripping jaws is displaceable between a holding position and a release position in a radial direction. In the holding position, the at least two gripping jaws are configured to hold the cap. In the release position, the at least two gripping jaws are configured to release the cap. The decapper further comprises an enclosure device according to anyone of the embodiments as described above or will be described hereinafter. Particularly, the enclosure device is mounted to the cap gripper.

Thus, a decapper is provided reliably preventing spillage of liquid onto any sensitive areas.

The decapper may comprise a container holder configured to hold the laboratory sample container. Thus, the laboratory sample container may be fixed in its position for decapping.

The container holder and the cap gripper with its at least two gripping jaws may be displaceable relatively to each other in an axial direction. Thus, the cap may be removed by unplugging the cap.

The container holder and the cap gripper with its at least two gripping jaws may be rotatable relatively to each other around the axial direction. Thus, the cap may be removed from the laboratory sample container by an unscrewing movement.

According to a second aspect of the present disclosure, an apparatus is disclosed. The apparatus comprises a decapper according to anyone of the embodiments referring to a decapper as described above or as will be described hereinafter. The apparatus further comprises a cap receiver. The cap receiver is rotatable between a receiver position and a storage position around a receiver axis. In the receiver position, the decapper and the cap receiver are arranged such that the cap receiver is configured to receive the released cap from the decapper. In the storage position, the cap receiver is configured to allow removing of the cap from the laboratory sample container.

The term "enclosure device" as used herein is a broad term and is to be given its ordinary and customary meaning to a person of ordinary skill in the art and is not to be limited to a special or customized meaning. The term specifically may refer, without limitation, to any of any device creating a partially or fully enclosed space that can be used to contain or surround an object or constructional member. The term may particularly refer to a receptacle or enclosure for containing or surrounding an object or constructional member.

The term "wall portion" as used herein is a broad term and is to be given its ordinary and customary meaning to a person of ordinary skill in the art and is not to be limited to a special or customized meaning. The term specifically may refer, without limitation, to a structure and a surface of the enclosure device that defines an area. A wall portion is particularly impermeable for liquids and may shelter an object.

The term "reservoir portion" as used herein is a broad term and is to be given its ordinary and customary meaning to a person of ordinary skill in the art and is not to be limited to a special or customized meaning. The term specifically may refer, without limitation, to a part of the enclosure device providing a storage space for fluids, particularly liquids. A reservoir portion may hold and at least temporarily store liquids.

The term "gripping jaw" as used herein is a broad term and is to be given its ordinary and customary meaning to a person of ordinary skill in the art and is not to be limited to a special or customized meaning. The term specifically may refer, without limitation, to a jaw-shaped device that is configured to hold something such as an object very tightly. A jaw refers to any opposable articulated structure for grasping something. For this purpose, jaws can open and close relative to one another.

The term "laboratory sample container" as used herein is a broad term and is to be given its ordinary and customary meaning to a person of ordinary skill in the art and is not to be limited to a special or customized meaning. The term specifically may refer, without limitation, to a device designed as a tube. The laboratory sample container is typically made of glass or transparent plastic and typically has an opening at an upper end. The container can be used to contain, store and transport a laboratory sample such as a blood sample, an urine sample or any other chemical sample.

The term "cap" as used herein is a broad term and is to be given its ordinary and customary meaning to a person of ordinary skill in the art and is not to be limited to a special or customized meaning. The term specifically may refer, without limitation, to a device that is typically used to close or seal the laboratory sample container, in particular its opening, and is typically embodied separate from the container. Depending on the laboratory sample and the container, the cap may have several functions. One may be to keep the container closed and the sample contained for the specified shelf life until time of opening. Another one may be to provide a barrier, e.g., to dirt, oxygen and/or moisture. The cap may comprise rubber and/or plastic or may completely consist of rubber and/or plastic. Further, the cap has typically a cylindrical shape, in particular with a circular cross section. Furthermore, the laboratory sample container and/or the cap have/has typically means of attaching to each other with sufficient security, e.g., threads, locks and/or adhesives may be used.

The term "continuous wall portion" as used herein is a broad term and is to be given its ordinary and customary meaning to a person of ordinary skill in the art and is not to be limited to a special or customized meaning. The term specifically may refer, without limitation, to a part of a wall formed as a continuous surface. Thus, the wall portion is formed as a kind of closed surface without any interruptions or openings.

The term “integrally formed” as used herein is a broad term and is to be given its ordinary and customary meaning to a person of ordinary skill in the art and is not to be limited to a special or customized meaning. The term specifically may refer, without limitation, to a formation of two or more constructional members as one piece. Such a formation may particularly be realized by a monolithically formation of the constructional members.

The term “decapper” as used herein is a broad term and is to be given its ordinary and customary meaning to a person of ordinary skill in the art and is not to be limited to a special or customized meaning. The term specifically may refer, without limitation, to any device configured to remove a cap from a laboratory sample container.

Further disclosed and proposed herein is a computer program including computer-executable instructions for performing the operation method according to the present disclosure in one or more of the embodiments enclosed herein when the program is executed on a computer or computer network. Specifically, the computer program may be stored on a computer-readable data carrier and/or on a computer-readable storage medium.

As used herein, the terms “computer-readable data carrier” and “computer-readable storage medium” specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps as indicated above may be performed by using a computer or a computer network, typically by using a computer program.

Further disclosed and proposed herein is a computer program product having program code means, in order to perform the method according to the present disclosure in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:

- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network,
- a computer program comprising program means according to the preceding embodiment, wherein the program means are stored on a storage medium readable to a computer,
- a storage medium, wherein a data structure is stored on the storage medium and wherein the data structure is adapted to perform the method according to one of the embodiments described in this description after having been loaded into a main and/or working storage of a computer or of a computer network, and
- a computer program product having program code means, wherein the program code means can be stored or are stored on a storage medium, for performing the method according to one of the embodiments described in this description, if the program code means are executed on a computer or on a computer network.

Summarizing and without excluding further possible embodiments, the following embodiments may be envisaged:

Embodiment 1: An enclosure device for a decapper for removing a cap from a laboratory sample container, wherein the decapper comprises a cap gripper comprising at least two gripping jaws, wherein at least one of the at least two gripping jaws is displaceable between a holding position and a release position in a radial direction, wherein in the holding position, the at least two gripping jaws are configured to hold the cap and wherein in the release position, the at least two gripping jaws are configured to release the cap, wherein the enclosure device comprises an outer enclosure portion and an inner enclosure portion disposed within the outer enclosure portion, wherein the outer enclosure portion comprises a wall portion and a reservoir portion at a bottom of the wall portion, wherein the wall portion of the outer enclosure portion is configured to enclose the two gripping jaws, wherein the inner enclosure portion is configured to receive a laboratory sample container and comprises at least two openings configured to allow the two gripping jaws to extend therethrough at least in the holding position, wherein the enclosure device is configured to be mounted to the cap gripper.

Embodiment 2: The enclosure device according to the preceding embodiment, wherein the enclosure device is configured to be releasably mounted to the cap gripper.

Embodiment 3: The enclosure device according to any preceding embodiment, wherein the enclosure device is configured to be mounted to the cap gripper at a top of the wall portion.

Embodiment 4: The enclosure device according to any preceding embodiment, wherein the reservoir portion is configured to surround the laboratory sample container.

Embodiment 5: The enclosure device according to any preceding embodiment, wherein the wall portion of the outer enclosure portion is a continuous wall portion.

Embodiment 6: The enclosure device according to any preceding embodiment, wherein the wall portion of the outer enclosure portion is configured to completely enclose the two gripping jaws in a circumferential direction.

Embodiment 7: The enclosure device according to any preceding embodiment, wherein the reservoir portion comprises a reception opening configured to allow the laboratory sample container to extend therethrough.

Embodiment 8: The enclosure device according to the preceding embodiment, wherein the reservoir portion comprises a rim defining the reception opening.

Embodiment 9: The enclosure device according to the preceding embodiment, wherein the rim protrudes towards a top of the wall portion.

Embodiment 10: The enclosure device according to embodiment 8 or 9, wherein the rim is cylindrically or conically shaped.

Embodiment 11: The enclosure device according to any preceding embodiment, wherein the reservoir portion is permanently or releasably connected to the wall portion.

Embodiment 12: The enclosure device according to any preceding embodiment, wherein the wall portion is substantially cylindrically shaped.

Embodiment 13: The enclosure device according to any preceding embodiment, wherein the reservoir portion and the inner enclosure portion are connected to one another or are integrally formed.

Embodiment 14: The enclosure device according to any preceding embodiment, wherein the inner enclosure portion is at least partially cylindrically shaped.

Embodiment 15: The enclosure device according to any preceding embodiment, wherein the inner enclosure portion is configured to limit a movement of the cap in the radial direction.

Embodiment 16: A decapper for removing a cap from a laboratory sample container, comprising a cap gripper comprising at least two gripping jaws, wherein at least one of the at least two gripping jaws is displaceable between a holding position and a release position in a radial direction, wherein in the holding position, the at least two gripping jaws are configured to hold the cap and wherein in the release position the at least two gripping jaws are configured to release the cap, wherein the decapper further comprises an enclosure device according to anyone of the preceding embodiments.

Embodiment 17: The decapper according to the preceding embodiment, wherein the decapper comprises a container holder, wherein the container holder is configured to hold the laboratory sample container.

Embodiment 18: The decapper according to the preceding embodiment, wherein the container holder and the cap gripper with its at least two gripping jaws are displaceable relatively to each other in an axial direction.

Embodiment 19: The decapper according to the preceding embodiment, wherein the container holder and the cap gripper with its at least two gripping jaws are rotatable relatively to each other around the axial direction.

Embodiment 20: An apparatus comprising a decapper according to anyone of embodiments 16 to 19 and a cap receiver, wherein the cap receiver is rotatable between a receiver position and a storage position around a receiver axis, wherein in the receiver position the decapper and the cap receiver are arranged such that the cap receiver is configured to receive the released cap from the decapper and wherein in the storage position the cap receiver is configured to allow removing of the cap from the laboratory sample container.

In order that the embodiments of the present disclosure may be more readily understood, reference is made to the following examples, which are intended to illustrate the disclosure, but not limit the scope thereof.

FIG. 1 shows a schematical illustration of an apparatus 100. The apparatus 100 comprises a decapper 102. The decapper 102 is configured to automatically remove a cap 104 from a laboratory sample container 106. The decapper 102 comprises a cap gripper 108 comprising two gripping jaws 110. In a different embodiment the cap gripper may comprise at least three, four, five, six or more gripping jaws. Both gripping jaws 110 are displaceable between a holding position and a release position in or along a radial direction 112. In a different embodiment, it may be sufficient that only one of the at least two gripping jaws 110 may be displaceable between the holding position and the release position in the radial direction 112. In the holding position, the gripping jaws 110 hold or fix the cap 104. In the release position, the cap 104 is released by the gripping jaws 110. Optionally, the decapper 102 may comprise a guidance or mechanical stop (not shown in detail). The guidance is adapted to limit or prevent a movement of the cap 104 in the radial direction 112 caused by the displacement of one of the gripping jaws 110 from its holding position into its release position.

In detail, the laboratory sample container 106 is designed as a tube having an opening at an upper end. The cap 104 is used to close the laboratory sample container 106, in particular its opening. For example, the cap 104 has a thread and is screwed on the laboratory sample container 106. Needless to say, the thread of the cap 104 may be omitted and the cap 104 may be pressed into the laboratory sample container 106. Further, the cap 104 has a cylindrical shape, in particular with a circular cross section. Furthermore, the cap 104 is completely made of rubber and/or plastic. The gripping jaws 100 are evenly distributed around an axial direction 114. The axial direction 114 is perpendicular to the radial direction 112. In the holding position, the gripping jaws 110 are relatively closer to each other in the radial direction 112 than in the release position. The gripping jaws 110 hold the cap 104 at its periphery or circumference 116 in a force-fit manner and in a form-fit manner. A longitudinal axis of the cylindrical shaped cap 104 coincidences with the axial direction 114. Optionally, each gripping jaw 110 may comprises a blade (not shown in detail). The blades are configured to cut or engrave or nick into the cap 104, in particular into the circumference 116 of the cap 104. The blades are made of a metal. The gripping jaws 110 and the blades, respectively, extend around the axial direction 114 and thereby along the circumference 116 of the cap 104 almost completely. Each of the gripping jaws 110 is attached to a finger or an arm of the cap gripper 108. The fingers may be moved by at least one actuator for the displacement of the gripping jaws 110 between their holding position and their release position.

In addition to the cap gripper 108 and the guidance, the decapper 102 comprises a container holder 118. The container holder 118 holds the laboratory sample container 106, in particular in such a way that a longitudinal axis of the laboratory sample container 106 in form of the tube coincidences with the axial direction 114. The container holder 118 may be embodied as a gripper. Further, the container holder 118 and the cap gripper 108 with its gripping jaws 110 are displaceable relatively to each other in the axial direction 114. Further, the container holder 118 and the cap gripper 108 with its gripping jaws 110 are rotatable relatively to each other around the axial direction 114. Thereby, the held cap 104 is unscrewed from the laboratory sample container 106 such that the cap 104 is removed from the laboratory sample container 106. In a different embodiment, in particular in case the cap 104 has a rubber stopper and is attached to the laboratory sample container 106 by a friction fit, it may be sufficient that the container holder 118 and the cap gripper 108 with its gripping jaws 110 may be displaceable relatively to each other in the axial direction 114 only such that the held cap 104 is pulled away from the laboratory sample container 106. In the shown embodiment, the cap gripper 108 is arranged vertically above the container holder 118 such that, after the removal of the cap 104, the open end of the laboratory sample container 106 is vertically above the rest of the laboratory sample container 106. In particular the decapper 102 with its cap gripper 108 and its container holder 118 is oriented in such a way, that the axial direction 114 corresponds to the vertical. After the removal of the cap 104 from the laboratory sample container 106, the cap 104 may be released by the gripping jaws 110. Then, it may come off the gripping jaws 110, in particular it may fall down due to gravity. However, the cap 104 may stick or adhere to one of the gripping jaws 110.

A movement of the cap 104 in the radial direction 112 caused by the displacement of the gripping jaws 110 from their holding position into their release position is limited by the guidance, which is embodied separate from the gripping jaws 110. In detail, the guidance comprises two guidance elements. The guidance elements are arranged in the radial direction 112 opposite to each other such that they surround the held cap 104 on opposite sides. The guidance elements are adapted to limit or prevent a movement of the cap 104 in the radial direction 112. The guidance elements extend around the axial direction 114 and thereby along the circumference 116 of the cap 104, in particular completely. The guidance elements may form a ring, in particular a closed ring. The ring has a circular cross section. Generally, the guidance elements may be embodied separate from each other. Furthermore, in a different embodiment the guidance may comprise at least three, four, five, six or more guidance elements. In particular, the number of guidance elements may correspond to the number of gripping jaws 110. However, the ring is one piece in the present embodiment.

FIG. 1 further shows an enclosure device 120 for the decapper 102. The enclosure device comprises an outer enclosure portion 122 and an inner enclosure portion 124. The inner enclosure portion 124 is disposed within the outer enclosure portion 122. The outer enclosure portion 122 is substantially cylindrically shaped. Particularly, the wall portion 126 is substantially cylindrically shaped. The outer enclosure portion 122 comprises a wall portion 126 and a reservoir portion 128 at a bottom 130 of the wall portion 126. The wall portion 126 of the outer enclosure portion 122 is configured to enclose the two gripping jaws 110. For this purpose, the wall portion 126 of the outer enclosure portion 122 is a continuous wall portion. Particularly, the wall portion 126 of the outer enclosure portion 122 is configured to completely enclose the two gripping jaws 110 in a circumferential direction. The circumferential direction may be defined as a direction coaxially around the axial direction 114.

The reservoir portion 128 is permanently or releasably connected to the wall portion 126. The reservoir portion 128 is configured to surround the laboratory sample container 106. The reservoir portion 128 comprises a reception opening 132 configured to allow the laboratory sample container 106 to extend therethrough. Further, the reservoir portion 128 comprises a rim 134 defining the reception opening 132. The rim 134 protrudes towards a top 136 of the wall portion 126. In the present embodiment, the rim 134 is conically shaped. Needless to say, the rim 134 may alternatively be cylindrically shaped.

The inner enclosure portion 124 is configured to receive the laboratory sample container 106. The inner enclosure portion 124 comprises at least two openings 138 configured to allow the two gripping jaws 110 to extend therethrough at least in the holding position. The reservoir portion 128 and the inner enclosure portion 124 are connected to one another or are integrally formed. The inner enclosure portion 124 is at least partially cylindrically shaped. Thus, the inner enclosure portion 124 is formed similarly to a cage. The inner enclosure portion 124 is further configured to limit a movement of the cap 104 in the radial direction 112.

As shown in FIG. 1, the enclosure device 120 is configured to be mounted to the cap gripper 108. Particularly, the enclosure device 120 is configured to be releasably mounted to the cap gripper 108. For example, the enclosure device 120 may be mounted to the cap gripper 108 by means of screws (not shown in detail). More particularly, the enclosure device 120 is configured to be mounted to the cap gripper 108 at the top 136 of the wall portion 126.

The apparatus 100 further comprises a cap receiver 140. The cap receiver 140 is rotatable between a receiver position and a storage position around a receiver axis 142 in particular corresponding to the vertical. In the receiver position, the decapper 102 and the cap receiver 140 are arranged such that the cap receiver 140 is configured to receive the released cap 104 from the decapper 102. Particularly, the cap receiver 140 is arranged vertically below the gripping jaws 110 of the cap gripper 108 of the decapper 102. Thereby, the released cap 104 may fall onto and/or into the cap receiver 140 due to gravity. Due to the guidance, the cap 104 actually falls down, where it is supposed to do so. In the storage position, the cap receiver 140 allows removing of the cap 104 from the laboratory sample container 106, as can be seen in FIG. 1.

Furthermore, the apparatus 100 comprises a mounting base 144 in form of an adapter plate. The cap receiver 140 is mechanically connected to the mounting base 144 by a key hole coupling system (not shown in detail). The mounting base 144 is rotatable around the receiver axis 142 as well. The rotation of the cap receiver 140 between the receiver position and the storage position is performed by a rotational movement of the mounting base 144. Further, the apparatus 100 comprises a not-shown cap disposal compartment and the cap receiver 140 is connected to the cap disposal compartment such that the received cap 104 is passed by the cap receiver 140 into the cap disposal compartment.

Hereinafter, the operation of the apparatus 100, particularly of the decapper 102 and the enclosure device 120 will be described in further detail. As shown in the left part of FIG. 1, a laboratory sample container 106 having a cap 104 mounted to its top or opening is conveyed towards the decapper 102. As shown in the middle part of FIG. 1, thereby, the laboratory sample container 106 is disposed in the container holder 118 where it is held in its position. The cap gripper 108 with its gripping jaws 110 is displaced relatively to the container holder 118 in the axial direction 114 towards one another. For example, the cap gripper 108 is lowered. Thus, enclosure device 120 and the wall portion 126, respectively, surrounds the laboratory sample container 106. Particularly, the inner enclosure portion 124 receives the laboratory sample container 106 and the laboratory sample container 106 extends through the reception opening 132 of the reservoir portion 128. The gripping jaws 110 are displaced from the release position into the holding position in the radial direction 112. Thereby, the gripping jaws 110 penetrates or extends through the openings 138 of the inner enclosure portion 124. Further, in the holding position, the gripping jaws 110 tightly engage the cap 104. Subsequently, the container holder 118 and the cap gripper 108 with its gripping jaws 110 are rotated relatively to each other around the axial direction 114. For example, the cap gripper 108 is rotated around the axial direction 114. It has to be noted that the enclosure device 120 is integrally rotated with the cap gripper 108 as it is mounted thereto. Thereby, the held cap 104 is unscrewed from the laboratory sample container 106 such that the cap 104 is removed from the laboratory sample container 106. Any liquid sample spilled out of the laboratory sample container 106 caused by the rotational movement of the cap gripper 106 and/or any vibrations during the rotation is captured by the enclosure device. Particularly, any drops spilled out of the laboratory sample container 106 are captured by the inner enclosure portion 124 and the wall portion 126 from where they are guided to the reservoir portion 128. Thus, the drops are prevented from landing in sensitive areas of the apparatus 100.

Subsequently, the cap gripper 108 with its gripping jaws 110 is displaced relatively to the container holder 118 in the axial direction 114 towards away from one another. For example, the cap gripper 108 is raised. It has to be noted that during the displacement of the cap gripper 108 away from the container folder, the gripping jaws 110 are still in the holding position so as to hold the cap 104. Subsequently, the opened laboratory sample container 106 is further conveyed as indicated in the right part of FIG. 1. The cap receiver 140 is rotated from the storage position into the receiver position around the receiver axis 142. In the receiver position, the decapper 102 and the cap receiver 140 are arranged such that the cap receiver 140 can receive the released cap 104 from the decapper 102. Particularly, the cap receiver 140 is arranged vertically below the gripping jaws 110 of the cap gripper 108 of the decapper 102. The gripping jaws 110 are displaced into the release position in the radial direction 112. Thereby, the gripping jaws 100 can strip the cap 104 off at the openings 138 of the inner enclosure portion 124 if the cap 104 adheres to the gripping jaws 110. Thereby, the released cap 104 may fall onto and/or into the cap receiver 140 due to gravity. Subsequently, the cap receiver 140 is rotated back from the receiver position into the storage position around the receiver axis 142. Any liquid sample received by the reservoir portion 128 may be removed from time to time either by releasing the enclosure device 120 from the cap gripper 108 or by removing the reservoir portion 128 from the wall portion 126.

LIST OF REFERENCE NUMBERS

100 apparatus
102 decapper
104 cap
106 laboratory sample container
108 cap gripper
110 gripping jaws
112 radial direction
114 axial direction
116 circumference
118 container holder
120 enclosure device
122 outer enclosure portion
124 inner enclosure portion
126 wall portion
128 reservoir portion
130 bottom
132 reception opening
134 rim
136 top
138 opening
140 cap receiver
142 receiver axis
144 mounting base

What is claimed is:

1. A decapper for removing a cap from a laboratory sample container, wherein the decapper comprises:

a cap gripper comprising at least two gripping jaws, wherein at least one of the at least two gripping jaws is displaceable between a holding position and a release position in a radial direction, wherein in the holding position, the at least two gripping jaws are configured to hold the cap and wherein in the release position, the at least two gripping jaws are configured to release the cap; and an enclosure device, wherein the enclosure device comprises an outer enclosure portion and an inner enclosure portion disposed within the outer enclosure portion, wherein the outer enclosure portion comprises a wall portion, a reservoir portion extending inwardly from the wall portion, and an inner wall portion spaced inwardly from the wall portion and extending upwardly from the reservoir portion, the wall portion, the reservoir portion and the inner wall portion defining a reservoir with the reservoir portion as a bottom of the reservoir and the wall portion and the inner wall portion as walls of the reservoir, wherein the wall portion of the outer enclosure portion is configured to enclose the two gripping jaws, wherein the inner enclosure portion is configured to receive the laboratory sample container and comprises at least two openings configured to allow the two gripping jaws to extend therethrough at least in the holding position, wherein the enclosure device is configured to be mounted to the cap gripper.

2. The decapper according to claim 1, wherein the enclosure device is releasably mounted to the cap gripper.

3. The decapper according to claim 1, wherein the enclosure device is mounted to the cap gripper at a top of the wall portion.

4. The decapper according to claim 1, wherein the reservoir surrounds the laboratory sample container.

5. The decapper according to claim 1, wherein the outer enclosure wall completely encloses the two gripping jaws in a circumferential direction.

6. The decapper according to claim 1, wherein the reservoir portion comprises a reception opening allowing the laboratory sample container to extend therethrough.

7. The decapper according to claim 6, wherein the inner wall portion comprises a rim defining the reception opening.

8. The decapper according to claim 7, wherein the rim protrudes towards a top of the wall portion.

9. The decapper according to claim 1, wherein the reservoir portion is permanently or releasably connected to the wall portion.

10. The decapper according to claim 1, wherein the reservoir portion and the wall portion are connected to one another or are integrally formed.

11. The decapper according to claim 1, wherein the wall portion is at least partially cylindrically shaped.

12. The decapper according to claim 1, wherein the wall portion is configured to limit a movement of the cap in the radial direction.

13. The decapper according to claim 1, wherein the decapper comprises a container holder, wherein the container holder is configured to hold the laboratory sample container.

14. An apparatus comprising the decapper according to claim 1 and a cap receiver, wherein the cap receiver is rotatable between a receiver position and a storage position around a receiver axis, wherein in the receiver position the decapper and the cap receiver are arranged such that the cap receiver is configured to receive the released cap from the decapper and wherein in the storage position the cap receiver is configured to allow removing of the cap from the laboratory sample container.

15. The decapper according to claim 1, wherein the reservoir is configured to hold and at least temporarily store liquids.

16. The decapper of claim 15, wherein the reservoir is configured to collect liquid from between the inner enclosure portion and the wall portion.

17. The decapper of claim 15, wherein the inner enclosure portion and the wall portion direct spilled liquid from a laboratory sample container into the reservoir.

18. The decapper of claim 15, in which the inner enclosure portion, the wall portion and the reservoir portion are configured such that liquid spilled from the laboratory sample container passes between the inner enclosure portion and the wall portion and is received in the reservoir.

19. The decapper of claim 15, wherein the wall portion is spaced apart from the inner enclosure portion.

20. The decapper of claim 19, wherein the reservoir portion extends from the wall portion to inside of the inner enclosure portion.

21. The decapper of claim 15, wherein the inner enclosure portion is spaced inwardly of the wall portion.

22. The decapper of claim 21, in which the inner enclosure portion, the wall portion and the reservoir portion are configured such that liquid spilled from the laboratory sample container passes between the inner enclosure portion and the wall portion and is received in the reservoir.

23. The decapper of claim 21, in which the reservoir has an annular shape.

24. The decapper of claim 23, wherein the reservoir portion comprises a reception opening configured to allow the laboratory sample container to extend therethrough.

25. The enclosure device decapper of claim 15, in which the reservoir portion is permanently connected to the outer enclosure wall portion.

26. The decapper of claim 1, wherein two or more holes are formed in the inner enclosure portion.

27. A decapper for removing a cap from a laboratory sample container, wherein the decapper comprises:

a cap gripper comprising at least two gripping jaws, wherein at least one of the at least two gripping jaws is displaceable between a holding position and a release position in a radial direction, wherein in the holding position, the at least two gripping jaws are configured to hold the cap and wherein in the release position, the at least two gripping jaws are configured to release the cap; and an enclosure device, wherein the enclosure device comprises an outer enclosure portion and an inner enclosure portion disposed within the outer enclosure portion, wherein the outer enclosure portion comprises a wall portion, a reservoir portion extending inwardly from the wall portion, and an inner wall portion spaced inwardly from the wall portion and extending upwardly from the reservoir portion, the wall portion, the reservoir portion and the inner wall portion defining a reservoir with the reservoir portion as a bottom of the reservoir and the wall portion and the inner wall portion as walls of the reservoir, the reservoir being in the form of a container, wherein the wall portion of the outer enclosure portion is configured to enclose the two gripping jaws, wherein the inner enclosure portion is configured to receive the laboratory sample container and comprises at least two openings configured to allow the two gripping jaws to extend therethrough at least in the holding position, wherein the enclosure device is configured to be mounted to the cap gripper.

28. A decapper for removing a cap from a laboratory sample container, wherein the decapper comprises:

a cap gripper comprising at least two gripping jaws, wherein at least one of the at least two gripping jaws is displaceable between a holding position and a release position in a radial direction, wherein in the holding position, the at least two gripping jaws are configured to hold the cap and wherein in the release position, the at least two gripping jaws are configured to release the cap; and an enclosure device, wherein the enclosure device comprises an outer enclosure portion and an inner enclosure portion disposed within the outer enclosure portion, wherein the outer enclosure portion comprises a wall portion, a reservoir portion extending inwardly from the wall portion, and an inner wall portion spaced inwardly from the wall portion and extending upwardly from the reservoir portion, the wall portion, the reservoir portion and the inner wall portion defining a reservoir with the reservoir portion as a bottom of the reservoir and the wall portion and the inner wall portion as walls of the reservoir, the reservoir portion being permanently or releasably connected to the wall portion of the outer enclosure portion, wherein the wall portion of the outer enclosure portion is configured to enclose the two gripping jaws, wherein the inner enclosure portion is configured to receive the laboratory sample container and comprises at least two openings configured to allow the two gripping jaws to extend therethrough at least in the holding position, wherein the enclosure device is configured to be mounted to the cap gripper.

29. A decapper for removing a cap from a laboratory sample container, wherein the decapper comprises:

a cap gripper comprising at least two gripping jaws, wherein at least one of the at least two gripping jaws is displaceable between a holding position and a release position in a radial direction, wherein in the holding position, the at least two gripping jaws are configured to hold the cap and wherein in the release position, the at least two gripping jaws are configured to release the cap; and an enclosure device, wherein the enclosure device comprises an outer enclosure portion and an inner enclosure portion disposed within the outer enclosure portion, wherein the outer enclosure portion comprises a wall portion, a reservoir portion extending inwardly from the wall portion, and an inner wall portion spaced inwardly from the wall portion and extending upwardly from the reservoir portion, the wall portion, the reservoir portion and the inner wall portion defining a reservoir with the reservoir portion as a bottom of the reservoir and the wall portion and the inner wall portion as walls of the reservoir, the inner enclosure portion guiding liquid to the reservoir, wherein the wall portion of the outer enclosure portion is configured to enclose the two gripping jaws, wherein the inner enclosure portion is configured to receive the laboratory sample container and comprises at least two openings configured to allow the two gripping jaws to extend therethrough at least in the holding position, wherein the enclosure device is configured to be mounted to the cap gripper.

30. The decapper of claim 29, wherein the inner enclosure portion comprises an inner surface guiding liquid to the reservoir.

31. A decapper for removing a cap from a laboratory sample container, wherein the decapper comprises:

a cap gripper comprising at least two gripping jaws, wherein at least one of the at least two gripping jaws is displaceable between a holding position and a release position in a radial direction, wherein in the holding position, the at least two gripping jaws are configured to hold the cap and wherein in the release position, the at least two gripping jaws are configured to release the cap; and an enclosure device, wherein the enclosure device comprises an outer enclosure portion and an inner enclosure portion disposed within the outer enclosure portion, wherein the outer enclosure portion comprises a wall portion, a reservoir portion extending inwardly from the wall portion, and an inner wall portion spaced inwardly from the wall portion and extending upwardly from the reservoir portion, the wall portion, the reservoir portion and the inner wall portion defining a reservoir with the reservoir portion as a bottom of the reservoir and the wall portion and the inner wall portion as walls of the reservoir, wherein the inner wall portion comprises a rim defining the reception opening, the rim protruding towards a top of the wall portion, wherein the wall portion of the outer enclosure portion is configured to enclose the two gripping jaws, wherein the inner enclosure portion is configured to receive the laboratory sample container and comprises at least two openings configured to allow the two gripping jaws to extend therethrough at least in the holding position, wherein the enclosure device is configured to be mounted to the cap gripper.

* * * * *